US012572794B2

(12) United States Patent
El-Yaniv et al.

(10) Patent No.: US 12,572,794 B2
(45) Date of Patent: Mar. 10, 2026

(54) SYSTEM AND METHOD FOR AUTOMATED OPTIMIZATION OF A NEURAL NETWORK MODEL

(71) Applicant: NVIDIA Corporation, Santa Clara, CA (US)

(72) Inventors: Ran El-Yaniv, Haifa (IL); Yonatan Geifman, Bazra (IL); Jonathan Elial, Tel Aviv (IL)

(73) Assignee: NVIDIA Corporation, Santa Clara, CA (US)

( * ) Notice: Subject to any disclaimer, the term of this patent is extended or adjusted under 35 U.S.C. 154(b) by 1100 days.

(21) Appl. No.: 17/074,878

(22) Filed: Oct. 20, 2020

(65) Prior Publication Data

US 2022/0121922 A1     Apr. 21, 2022

(51) Int. Cl.
*G06N 3/08* (2023.01)
*G06F 18/24* (2023.01)
*G06N 3/045* (2023.01)

(52) U.S. Cl.
CPC ............... *G06N 3/08* (2013.01); *G06F 18/24* (2023.01); *G06N 3/045* (2023.01)

(58) Field of Classification Search
None
See application file for complete search history.

(56) References Cited

U.S. PATENT DOCUMENTS

| | | | |
|---|---|---|---|
| 2008/0089591 A1* | 4/2008 | Zhou | G06F 18/254 |
| | | | 382/224 |
| 2019/0012768 A1* | 1/2019 | Tafazoli Bilandi | G06T 7/13 |

| | | | |
|---|---|---|---|
| 2019/0073580 A1* | 3/2019 | Dzhulgakov | G06N 3/045 |
| 2019/0197395 A1* | 6/2019 | Kibune | G06N 3/08 |
| 2019/0251423 A1* | 8/2019 | Shazeer | G06N 3/082 |
| 2019/0354868 A1* | 11/2019 | Wierstra | G06N 3/086 |
| 2020/0005148 A1* | 1/2020 | Nori | G06N 3/042 |
| 2020/0125955 A1* | 4/2020 | Klinger | G06N 3/047 |
| 2020/0184327 A1* | 6/2020 | Dey | G06N 3/086 |
| 2020/0320400 A1* | 10/2020 | David | G06N 3/04 |

(Continued)

OTHER PUBLICATIONS

Qiao Jun-Fei et al: "A novel modular RBF neural network based on a brain-like partition method", Neural Computing and Applications, Springer London, London, vol. 32, No. 3, Oct. 6, 2018 (Oct. 6, 2018), pp. 899-911, XP036997291, ISSN: 0941-0643, DOI: 10.1007/S00521-018-3763-Z.

(Continued)

*Primary Examiner* — Abdullah Al Kawsar
*Assistant Examiner* — Asher H. Jablon
(74) *Attorney, Agent, or Firm* — The Roy Gross Law Firm, LLC; Roy D. Gross

(57) ABSTRACT

A system and method of automated optimization of a Neural Network (NN) model by at least one processor may include: receiving a pretrained NN model; constructing at least one master NN model, based on the pretrained NN model, each master NN model comprising a plurality of subnetworks; for each master NN model, constructing a router NN, adapted to direct one or more data instances of an input dataset to specific subnetworks of the master NN model; for each master NN model, calculating a utility score; and selecting a master NN model of the at least one constructed master NN models, based on the utility score.

17 Claims, 9 Drawing Sheets

(56)     References Cited

U.S. PATENT DOCUMENTS

2022/0004897 A1\*   1/2022   Jadon ..................... G06N 3/084
2022/0092404 A1\*   3/2022   O'Connor ............. G06F 18/214

OTHER PUBLICATIONS

Yunhe Wang et al: "DC-NAS: Divide-and-Conquer Neural Architecture Search", arxiv.org, Cornell University Library, 201 Olin Library Cornell University Ithaca, NY 14853, May 29, 2020 (May 29, 2020), XP081685512.
Shaoxiong Feng et al: "Collaborative Group Learning", arxiv.org, Cornell University Library, 201 Olin Library Cornell University Ithaca, NY 14853, Sep. 16, 2020 (Sep. 16, 2020), XP081764433.
Qiao Jun-Fei et al: "Design of Dynamic Modular Neural Network Based on Adaptive Particle Swarm Optimization Algorithm", IEEE Access, vol. 6, Feb. 6, 2018 (Feb. 6, 2018), pp. 10850-10857, XP011679061, DOI: 10.1109/ACCESS.2018.2803084.

\* cited by examiner

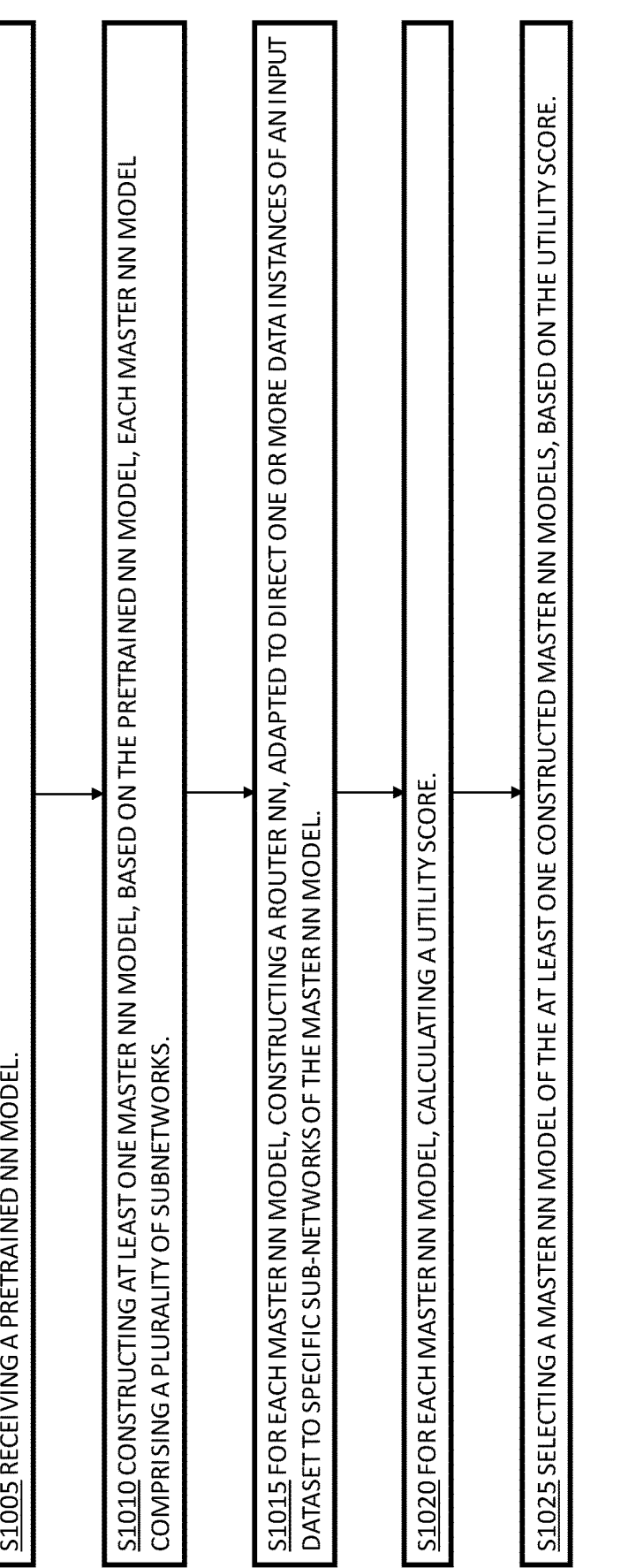

S1005 RECEIVING A PRETRAINED NN MODEL.

S1010 CONSTRUCTING AT LEAST ONE MASTER NN MODEL, BASED ON THE PRETRAINED NN MODEL, EACH MASTER NN MODEL COMPRISING A PLURALITY OF SUBNETWORKS.

S1015 FOR EACH MASTER NN MODEL, CONSTRUCTING A ROUTER NN, ADAPTED TO DIRECT ONE OR MORE DATA INSTANCES OF AN INPUT DATASET TO SPECIFIC SUB-NETWORKS OF THE MASTER NN MODEL.

S1020 FOR EACH MASTER NN MODEL, CALCULATING A UTILITY SCORE.

S1025 SELECTING A MASTER NN MODEL OF THE AT LEAST ONE CONSTRUCTED MASTER NN MODELS, BASED ON THE UTILITY SCORE.

FIG. 8

S2005 RECEIVING A PRETRAINED NN MODEL.

S2010 PERFORMING A NN SEARCH ALGORITHM, TO PRODUCE AT LEAST ONE MASTER NN MODEL, BASED ON THE PRETRAINED NN MODEL.

S2015 FOR EACH MASTER NN MODEL, CALCULATING A UTILITY SCORE.

S2020 SELECTING A MASTER NN MODEL OF THE AT LEAST ONE PRODUCED MASTER NN MODELS, BASED ON THE UTILITY SCORE.

SYSTEM AND METHOD FOR AUTOMATED OPTIMIZATION OF A NEURAL NETWORK MODEL

FIELD OF THE INVENTION

The present invention relates generally to the field of Artificial Intelligence (AI). More specifically, the present invention relates to automated optimization of a Neural Network (NN) model.

BACKGROUND OF THE INVENTION

As the integration of NN based algorithms into modern applications becomes ubiquitous, there is an ever growing need to facilitate execution of NN based algorithms, at an ever increasing speed.

Execution of NN models, including for example, training and inference of machine learning (ML) or deep learning (DL) models, may rely on the underlying hardware and/or software frameworks. Therefore, currently available systems may implement a first approach for increasing performance of NN based algorithms by executing such algorithms on powerful, customary processing machines, such as graphical processing units (GPUs) that may distribute the underlying computation over a large number of computing cores.

Another approach for accelerating execution of NN based applications may include decreasing the number of computations by compressing the NN model. Such solutions may include pruning of at least one portion of a NN or quantizing the numerical representation of elements of the NN model. Such methods may substantially accelerate inference time, but often compromise the accuracy of the NN model.

Another approach for accelerating execution of NN based applications may include a process that is commonly referred to in the art as Neural Architecture Search (NAS). The NAS process may include searching for an appropriate NN configuration within a space of allowable NN architectures. As known in the art, NAS-based NN search may show promising results for obtaining efficient NN architectures, but the process of arriving at a selected architecture may be extremely or even forbiddingly computationally intensive (e.g., in the order of thousands of GPU computation hours).

SUMMARY OF THE INVENTION

Embodiments of the invention may be adapted to receive (e.g., from a user) a pretrained NN model, in addition to corresponding training and/or validation datasets.

Embodiments of the invention may perform a confined NN search algorithm, as elaborated herein, to compute or produce at least one new NN model, based on the pretrained NN model. The at least one new NN model may herein be referred to as a master NN model.

According to some embodiments of the invention, the at least one master NN model may be adapted to substantially perform the same ML task as that of the original, pretrained NN model. For example, if the pretrained is adapted to receive an image that includes a depiction of a face and perform a task of face recognition thereupon, then the at least one master NN model may also be adapted to perform the face recognition ML task on incoming images. It may be appreciated that a master NN model may also be trained and/or tested, as commonly referred to in the art by data instances similar to those used for training and/or testing the original, pretrained NN model (e.g., in this example images portraying a face).

The term data instance may be used to refer to a data element that is included in a dataset. Pertaining to the same example, the training data set may include a plurality of images that may be used to train one or more elements included in a master NN model, and the term data instance may refer to any single such image included in the dataset.

According to some embodiments of the invention, the at least one master NN model may be configured to preserve the accuracy of the original pretrained NN model, and exhibit or have at least one performance parameter (e.g., latency, throughput and/or power consumption) that may be improved, in relation to that of the original pretrained NN model.

In other words, embodiments of the inventions may derive, from a pretrained NN model, an optimal architecture, a_opt of a master NN model. The term "optimal" may refer in this context to an architecture that may solve the following constrained optimization equation Eq. 1.

$$a\_opt = \operatorname{argmin}_{a \in A} \operatorname{Lat}_H(a,D), \text{subject to } \operatorname{Acc}(a,D) \geq \operatorname{Acc}(a_0,D) \qquad \text{EQ. 1}$$

In Eq. 1, "a_opt" may represent a desired optimal solution (e.g., corresponding to a selected configuration of a master NN model); "$a_0$" may represent an original NN model (e.g., provided by a user); "D" may represent an input dataset; and "Acc(a, D)" is a performance metric (e.g., accuracy) of model "a" over dataset "D".

Additionally, in Eq. 1, "$\operatorname{Lat}_H(a, D)$" may represent a measured metric of performance (e.g., a mean inference latency) of master NN model "a" over a dataset "D". It may be appreciated that the measured metric of performance $\operatorname{Lat}_H$ may be computed for, or in relation to a specific hardware and/or software platform "H".

Additionally, in Eq. 1, "A" may represent a NN architecture search space. In other words, "A" may be an aggregation of all possible master NN models that may be implemented or executed on a relevant hardware and/or software platform H. It may be appreciated that "A" be a confined NN search space. The term "confined" may be used herein to indicate that "A" may not include all possible NN configurations, but rather include the aggregation of possible master NN model configurations, as elaborated herein (e.g., in relation to FIG. 5)

While a precise solution (e.g., a "global optimum" solution, as known in the art) of Eq. 1 is often not possible, embodiments of the invention may produce one or more solutions a_opt that may substantially improve an objective performance metric (e.g., decrease latency of execution) of original model $a_0$ (e.g., $\operatorname{LatH}(a_0,D)$). It may be appreciated that a person skilled in the art may apply similar embodiments of the invention can be used to optimize other objective metrics (e.g., other than latency of execution). For example, embodiments of the invention may be configured to produce an architecture a_opt that may optimize throughput (e.g., the number of instances that can be calculated on H within a predefined unit of time) of the received model $a_0$ and/or an architecture a_opt that may optimize (e.g., minimize) the electric power consumption that may be required for calculation or execution of the model $a_0$ on a hardware and/or software platform H.

Embodiments of the present invention may include a method of automated construction and/or optimization of a NN model by at least one processor. Embodiments of the method may include: receiving a pretrained NN model;

constructing at least one master NN model, based on the pretrained NN model, each master NN model may include a plurality of subnetworks; for each master NN model, constructing a router NN, adapted to direct one or more data instances of an input dataset to specific subnetworks of the master NN model; for each master NN model, calculating a utility score; and selecting a master NN model of the at least one constructed master NN models, based on the utility score.

According to some embodiments of the invention, the pretrained NN model may include a first stem block, and the router NN may include a second stem block and a classification layer. Constructing the router NN may include: copying at least one portion of the first stem block to produce the second stem block; connecting a last layer of the second stem block to the classification layer to obtain a router NN; and connecting the last hidden layer of the router NN to the plurality of subnetworks.

Embodiments of the invention may include training at least one portion of the router NN to direct one or more data instances of the input dataset to a specific subnetwork of the master NN model. According to some embodiments of the invention, training at least one portion of the router NN may include: obtaining an activation pattern of neural nodes in a last layer of the stem block, corresponding to specific data instances of the input dataset; using a data-dependent algorithm to partition the dataset to clusters, based on the activation patterns; and training the at least one portion of the router NN to direct one or more data instances of the dataset to specific subnetworks, using said clusters as supervising data.

According to some embodiments of the invention, training the at least one portion of the router NN may include an initial training phase. The initial training phase may include: introducing to the at least one master NN model a plurality of data instances of the input dataset, to receive at least one output of the mater NN model; and training the at least one portion of the router NN, by back-propagating the output of the master NN model.

According to some embodiments of the invention, the pretrained NN model may include a first predictor block. Constructing at least one master NN model may include constructing a second predictor block that may be a copy of at least one portion of the first predictor block.

According to some embodiments of the invention, the pretrained NN model may include a feature generator block. Constructing at least one master NN model may include copying at least one portion of the feature generator block into one or more subnetworks of the plurality of subnetworks. Additionally, or alternatively, constructing at least one master NN model may include constructing, within one or more subnetworks of the plurality of subnetworks, a default NN, having a default number of layers and one or more default or predefined weight values.

Embodiments of the invention may receive a user's choice of a weight initialization option, including for example, initializing at least one weight value as a default value and initializing at least one weight value as a corresponding value of at least one weight of the feature generator block of the pretrained NN model. Embodiments of the invention may apply the chosen weight initialization option to at least one corresponding weight of one or more subnetworks of the plurality of subnetworks.

According to some embodiments of the invention, one or more (e.g., each) subnetwork may be adapted to: receive an input tensor from a last hidden layer of the router NN; and emit an output of the second feature generator block to the second predictor block.

According to some embodiments of the invention, the process of constructing a plurality of master NN models may include: performing one or more network transformation steps on a first master NN model, so as to produce one or more respective, second master NN models; training the one or more second master NN models on a subset of the input dataset; for each of the first master NN model and second master NN models calculating a corresponding utility score; and selecting at least one master NN model of the first master NN model and the one or more second master NN models based on said utility score. Said process iteratively, where for each iteration, a selected at least one master NN model of a previous iteration may be used as a new, first master NN model.

According to some embodiments of the invention, calculating a utility score of a master NN model that may include calculating a weighted sum of one or more metrics, including for example, a level of accuracy of a master NN model, a latency of execution of the master NN model, a throughput of execution of the master NN model and a value of power, consumed by execution of the master NN model.

According to some embodiments of the invention, subnetwork may include a plurality of NN layers, and each NN layer may be associated with a plurality of NN weight values. Training a master NN model may be performed incrementally (e.g., layer after layer) include: (a) selecting a NN layer; (b) introducing a plurality of data instances of the input dataset to the master NN model to obtain an output of the master NN model; (c) updating only NN weight values pertaining to the selected NN layer based on said output; and (d) repeating steps (b) and (c) with a subsequent NN layer.

According to some embodiments of the invention, training the one or more second master NN models may be performed in cycles. For each cycle, the one or more second master NN models may be trained during a single epoch. Selecting of at least one master NN model may include eliminating, after each predefined number of cycles, a fraction a of the master NN models from the master NN models available for selection. Said fraction a may correspond to the master NN models that have the worst (e.g., the lowest) utility score.

Embodiments of the invention may include: introducing one or more data instances of the input dataset to the selected master NN model; and training the selected master NN model based on the one or more introduced data instances.

Embodiments of the invention may include a system for automated construction and/or optimization of a NN model. Embodiments of the system may include: a non-transitory memory device, wherein modules of instruction code may be stored, and at least one processor associated with the memory device, and configured to execute the modules of instruction code. Upon execution of said modules of instruction code, the at least one processor may be configured to: receive a pretrained NN model; construct at least one master NN model, based on the pretrained NN model, each master NN model may include a plurality of subnetworks; for each master NN model, construct a router NN, adapted to direct one or more data instances of an input dataset to specific subnetworks of the master NN model; for each master NN model, calculate a utility score; and select a master NN model of the at least one constructed master NN models, based on the utility score.

Embodiments of the invention may include a method of automated optimization of a NN model by at least one processor. Embodiments of the method may include: receiving a pretrained NN model; performing a NN search algorithm, to produce at least one master NN model, based on the pretrained NN model; for each master NN model, calculating a utility score; and selecting a master NN model of the at least one produced master NN models, based on the utility score.

According to some embodiments of the invention, the search algorithm may be confined within an NN search space, according to content of one or more blocks of the pretrained NN model.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 8 is a flow diagram, depicting a method of automated construction and/or optimization of a NN model, according to some embodiments of the invention.

Figure 1:
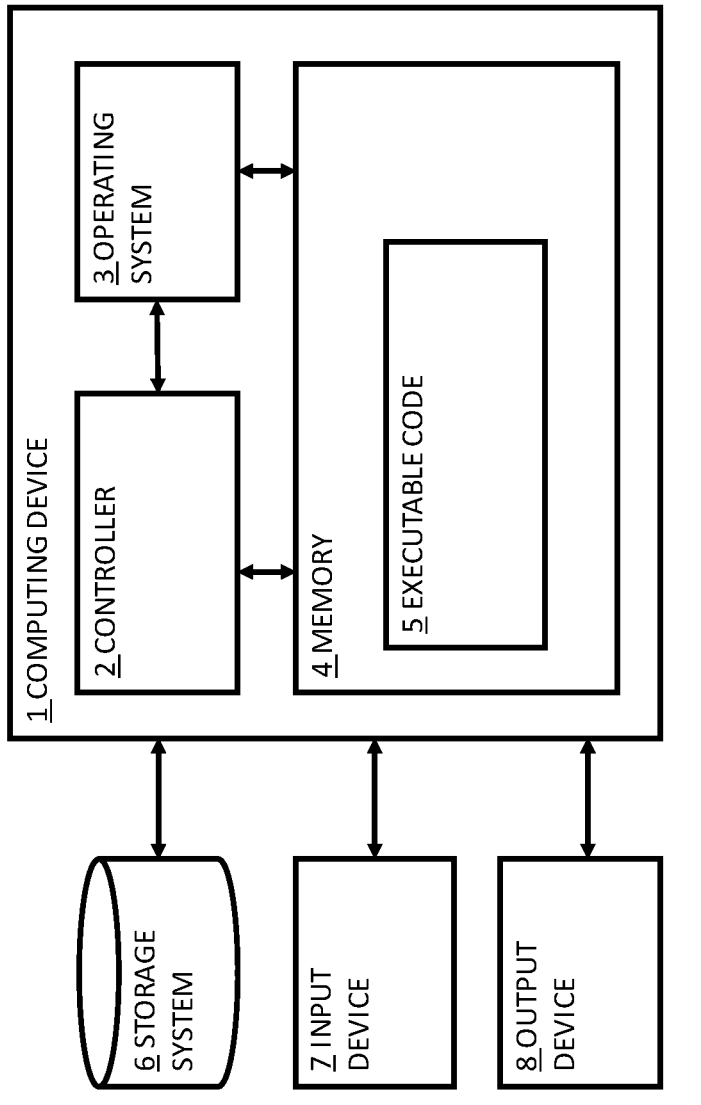
FIG. 1 is a block diagram, depicting a computing device which may be included in a system for automated construction and/or optimization of a NN model, according to some embodiments of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention. Some features or elements described with respect to one embodiment may be combined with features or elements described with respect to other embodiments. For the sake of clarity, discussion of same or similar features or elements may not be repeated.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term "set" when used herein may include one or more items.

Unless explicitly stated, the method embodiments described herein are not constrained to a particular order or sequence. Additionally, some of the described method embodiments or elements thereof can occur or be performed simultaneously, at the same point in time, or concurrently.

The term "neural network", e.g. a NN implementing machine learning, may refer to an information processing paradigm that may include nodes, referred to as neurons, organized into layers, with links between the neurons. The links may transfer signals between neurons and may be associated with weights. A NN may be configured or trained for a specific task, such as a task of pattern recognition, classification, object detection, etc. Training a NN for the specific task may involve adjusting these weights based on examples. Each neuron of an intermediate or last layer may receive an input signal, e.g., a weighted sum of output signals from other neurons, and may process the input signal using a linear or nonlinear function (e.g., an activation function). The results of the input and intermediate layers may be transferred to other neurons and the results of the output layer may be provided as the output of the NN. Typically, the neurons and links within a NN are represented by mathematical constructs, such as activation functions and matrices of data elements and weights. A processor, e.g. CPUs or graphics processing units (GPUs), or a dedicated hardware device may perform the relevant calculations.

Embodiments of the present invention disclose a method and a system for automated construction and/or optimization of a NN model.

Reference is now made to FIG. 1, which is a block diagram depicting a computing device, which may be included within an embodiment of a system for automated construction and/or optimization of a NN model, according to some embodiments.

Computing device 1 may include a processor or controller 2 that may be, for example, a central processing unit (CPU) processor, a chip or any suitable computing or computational device, an operating system 3, a memory 4, executable code 5, a storage system 6, input devices 7 and output devices 8. Processor 2 (or one or more controllers or processors, possibly across multiple units or devices) may be configured to carry out methods described herein, and/or to execute or act as the various modules, units, etc. More than one computing device 1 may be included in, and one or more computing devices 1 may act as the components of, a system according to embodiments of the invention.

Operating system 3 may be or may include any code segment (e.g., one similar to executable code 5 described herein) designed and/or configured to perform tasks involving coordination, scheduling, arbitration, supervising, controlling or otherwise managing operation of Computing device 1, for example, scheduling execution of software programs or tasks or enabling software programs or other modules or units to communicate. Operating system 3 may be a commercial operating system. It will be noted that an operating system 3 may be an optional component, e.g., in some embodiments, a system may include a computing device that does not require or include an operating system 3.

Memory 4 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 4 may be or may include a plurality of, possibly different memory units. Memory 4 may be a computer or processor non-transitory readable medium, or a computer non-transitory storage medium, e.g., a RAM. In one embodiment, a non-transitory storage medium such as memory 4, a hard disk drive, another storage device, etc. may store instructions or code which when executed by a processor may cause the processor to carry out methods as described herein.

Executable code 5 may be any executable code, e.g., an application, a program, a process, task or script. Executable code 5 may be executed by processor or controller 2 possibly under control of operating system 3. For example, executable code 5 may be an application that may automatically construct a NN model, act as a module such as a training module 120, perform inference on or act as a NN, etc., as further described herein. Although, for the sake of clarity, a single item of executable code 5 is shown in FIG. 1, a system according to some embodiments of the invention may include a plurality of executable code segments similar to executable code 5 that may be loaded into memory 4 and cause processor 2 to carry out methods described herein.

Storage system 6 may be or may include, for example, a flash memory as known in the art, a memory that is internal to, or embedded in, a micro controller or chip as known in the art, a hard disk drive, a CD-Recordable (CD-R) drive, a Blu-ray disk (BD), a universal serial bus (USB) device or other suitable removable and/or fixed storage unit. Data pertaining to construction and/or optimization of a NN model may be stored in storage system 6 and may be loaded from storage system 6 into memory 4 where it may be processed by processor or controller 2. In some embodiments, some of the components shown in FIG. 1 may be omitted. For example, memory 4 may be a non-volatile memory having the storage capacity of storage system 6. Accordingly, although shown as a separate component, storage system 6 may be embedded or included in memory 4.

Input devices 7 may be or may include any suitable input devices, components or systems, e.g., a detachable keyboard or keypad, a mouse and the like. Output devices 8 may include one or more (possibly detachable) displays or monitors, speakers and/or any other suitable output devices. Any applicable input/output (I/O) devices may be connected to Computing device 1 as shown by blocks 7 and 8. For example, a wired or wireless network interface card (NIC), a universal serial bus (USB) device or external hard drive may be included in input devices 7 and/or output devices 8. It will be recognized that any suitable number of input devices 7 and output device 8 may be operatively connected to Computing device 1 as shown by blocks 7 and 8.

A system according to some embodiments of the invention may include components such as, but not limited to, a plurality of central processing units (CPU) or any other suitable multi-purpose or specific processors or controllers (e.g., similar to element 2), a plurality of input units, a plurality of output units, a plurality of memory units, and a plurality of storage units.

Figures 2A, 2B:
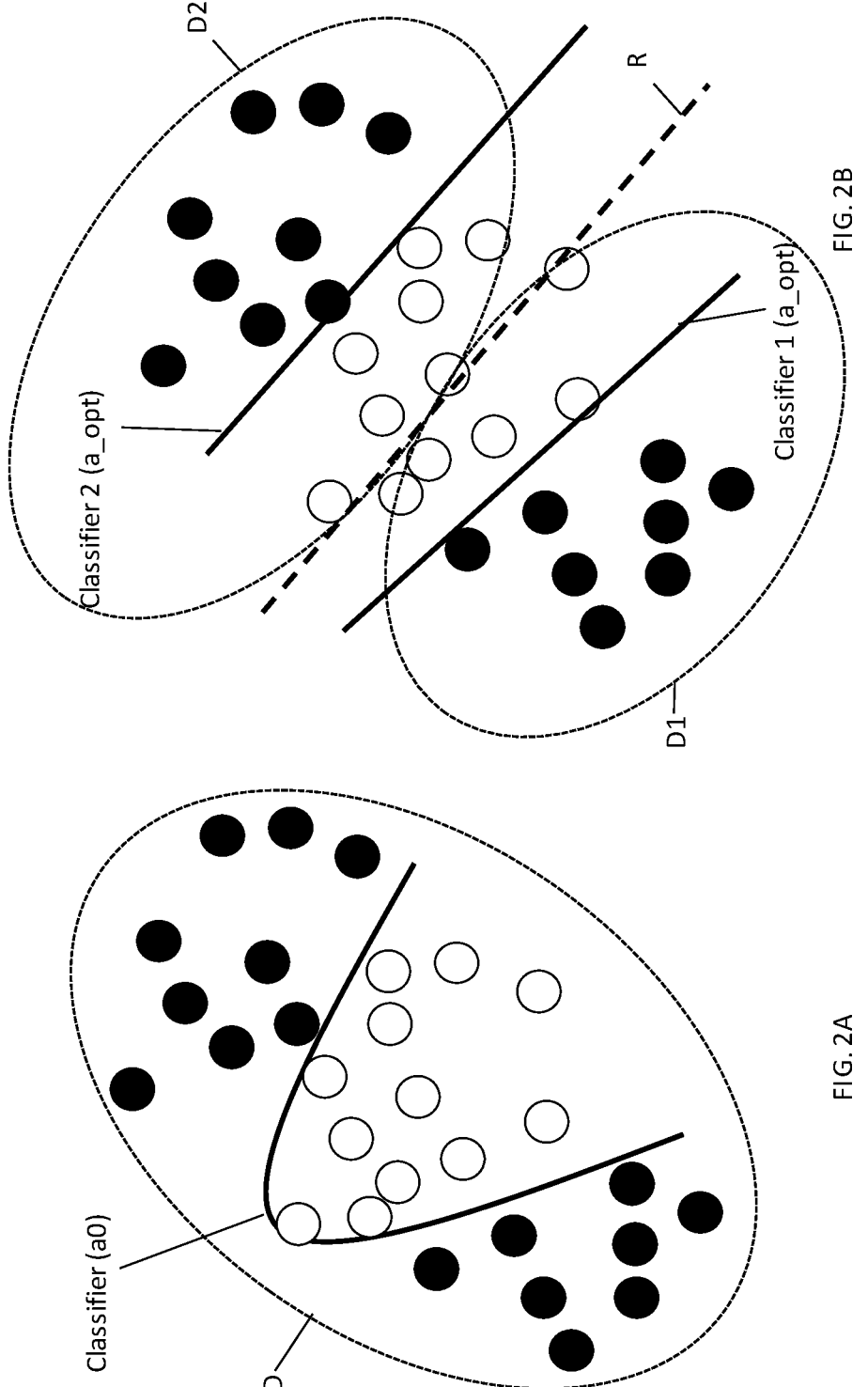
FIG. 2A is a schematic diagram, depicting a function of a neural network that may be adapted to perform a classification task.
FIG. 2B is a schematic diagram, depicting a function of a master neural network, that may implement an optimal neural network model according to some embodiments of the invention.

Reference is now made to FIGS. 2A and 2B, which is a schematic diagram, depicting a simplified example for dividing a relatively complex task of classification (or prediction, as known in the art) to a plurality of simpler tasks, as may be performed by embodiments of the invention.

As elaborated herein, embodiments of the invention may produce an approximated solution (e.g., a_opt) to the optimization problem of Eq. 1 by: (a) following a divide-and-conquer strategy, and (b) employing an automatic NN search procedure, to automatically search and determine the optimal model a_opt in a specific set "A" of possible NNs (herein referred to as an NN search space).

As elaborated herein, and according to some embodiments, each NN in the set A may include a plurality of subnetworks where each subnetwork may be specialized in a subdomain of a task of the original NN model $a_0$. In addition, each NN in A may include a component that may herein be referred to as a router, whose role is to direct each input instance to one of the subnetworks.

A NN which contains a router and a plurality of subnetworks may herein be referred to as a master model, or a master NN. A master NN in A may reflect a modeling strategy whereby an original complex prediction problem (e.g., as represented by NN model $a_0$) may be decomposed into a set of simpler sub-problems.

FIG. 2A may depict a function of a NN (e.g., an original NN $a_0$) that may be adapted to perform a classification task. As shown in FIG. 2A, NN model $a_0$ may include a single, high-order (e.g., a quadratic) classifier, marked herein as "classifier ($a_0$)". Classifier ($a_0$) may be adapted to classify instances of a dataset D (marked as circles) into one of two classes (e.g., classes of white and black circles).

FIG. 2B may depict a function of a master NN, that may implement an optimal NN model a_opt, according to some embodiments of the invention. As shown in FIG. 2B, embodiments of the invention may implement the "divide and conquer" strategy mentioned above. As elaborated herein, master NN may employ a router, that may divide or partition (as marked by line 'R') dataset D into two separate datasets (marked D1 and D2). The master NN of FIG. 2B may further employ two, relatively simpler (e.g., linear, or shallower) sub-models or sub-classifiers, marked herein as "classifier_1 (a_opt)" and "classifier_2 (a_opt)", to perform the task of classification on the respective portions (e.g., D1, D2) of dataset D.

It may be appreciated by a person skilled in the art that each of the sub-models (e.g., classifier_1 and classifier_2), as well as router R of FIG. 2B, may be significantly smaller than the original NN $a_0$ of FIG. 2A. Thus, instead of handling the entire data space D with the original NN $a_0$, which is typically large, each subnetwork (e.g., classifier_1 and classifier_2) may be specialized to classify only a part of dataspace D, and may thus enable a smaller mean calculation time for master NN implementing the optimal model a_opt.

Moreover, as each of the subnetworks (e.g., classifier_1 and classifier_2) may only be responsible for handling a portion of the task of classification, it may be appreciated by a person skilled in the art that it may handle its portion of the task with sufficiently high accuracy, so as not to diminish the overall accuracy of a_opt in relation to that of $a_0$.

Figure 3:
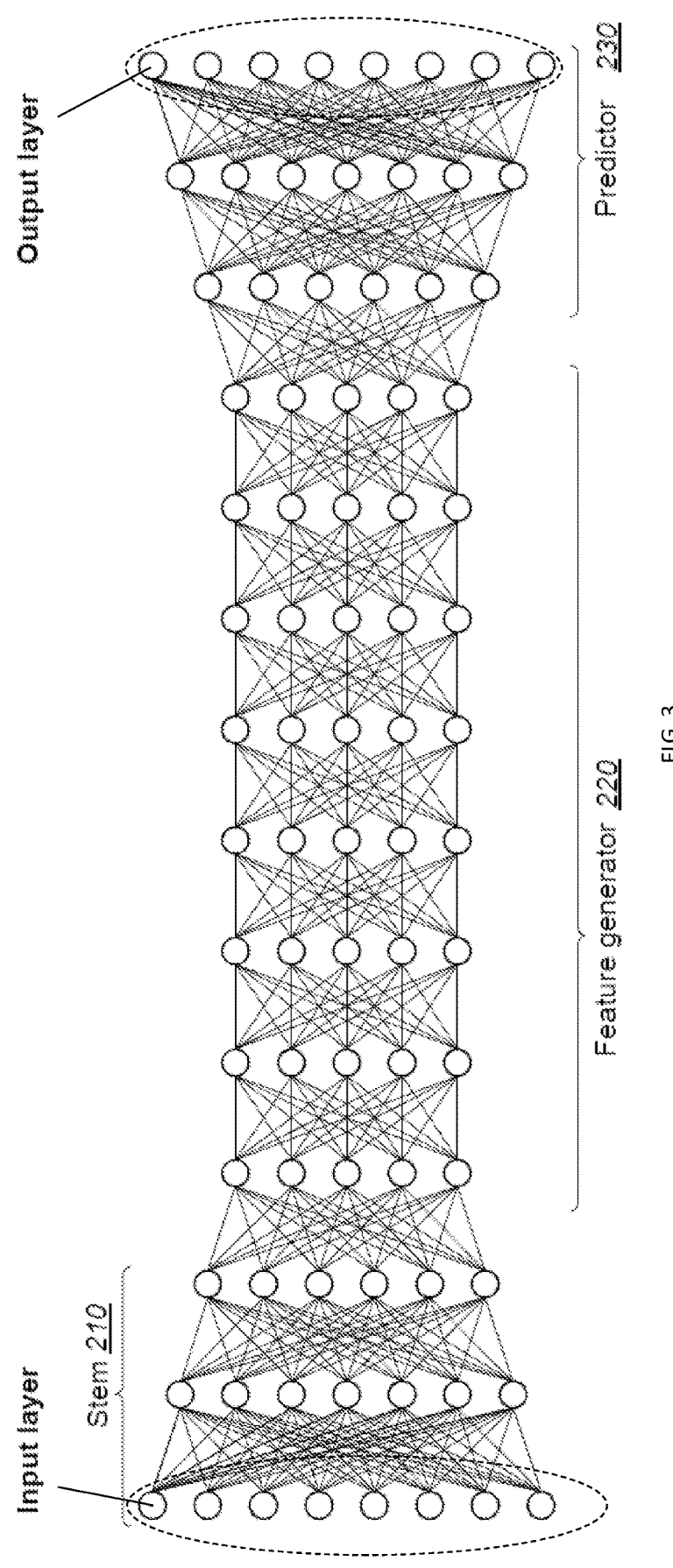
FIG. 3 is a schematic diagram depicting an example of a neural network, such as an original, pretrained NN, according to some embodiments of the invention.

Reference is now made to FIG. 3, which is a schematic diagram depicting an example of a neural network, such as original NN $a_0$, according to some embodiments of the invention.

As shown in FIG. 3, and as known in the art, original NN $a_0$ may be a feed-forward NN, and may include several blocks, such as a stem block, a feature generator block and a predictor block. Each block may include a plurality of layers, each such layer may include a plurality of neural nodes (marked herein as dots) that may be interconnected with other neural nodes, and each connection may be associated with a weight value, that may be adapted during a process of training to produce a pre-trained NN. In the example of FIG. 3, the drawn interconnections are concep- tual; NN $a_0$ may have any combination of feed-forward connections.

As known in the art, original NN $a_0$ may be associated with a set of hyperparameters, defining specific properties of NN $a_0$. For example, $a_0$ may be associated with one or more structural hyperparameters, defining structural elements of $a_0$, including for example the number of blocks (e.g., stem block, feature generator block and a predictor block), the number of layers pertaining to each block, etc. In another example, $a_0$ may be associated with one or more behavioral hyperparameters, defining elements of behavior of $a_0$ during a phase of NN training, including for example the cost function and step size used for adapting weights of the NN during training.

Figure 4:
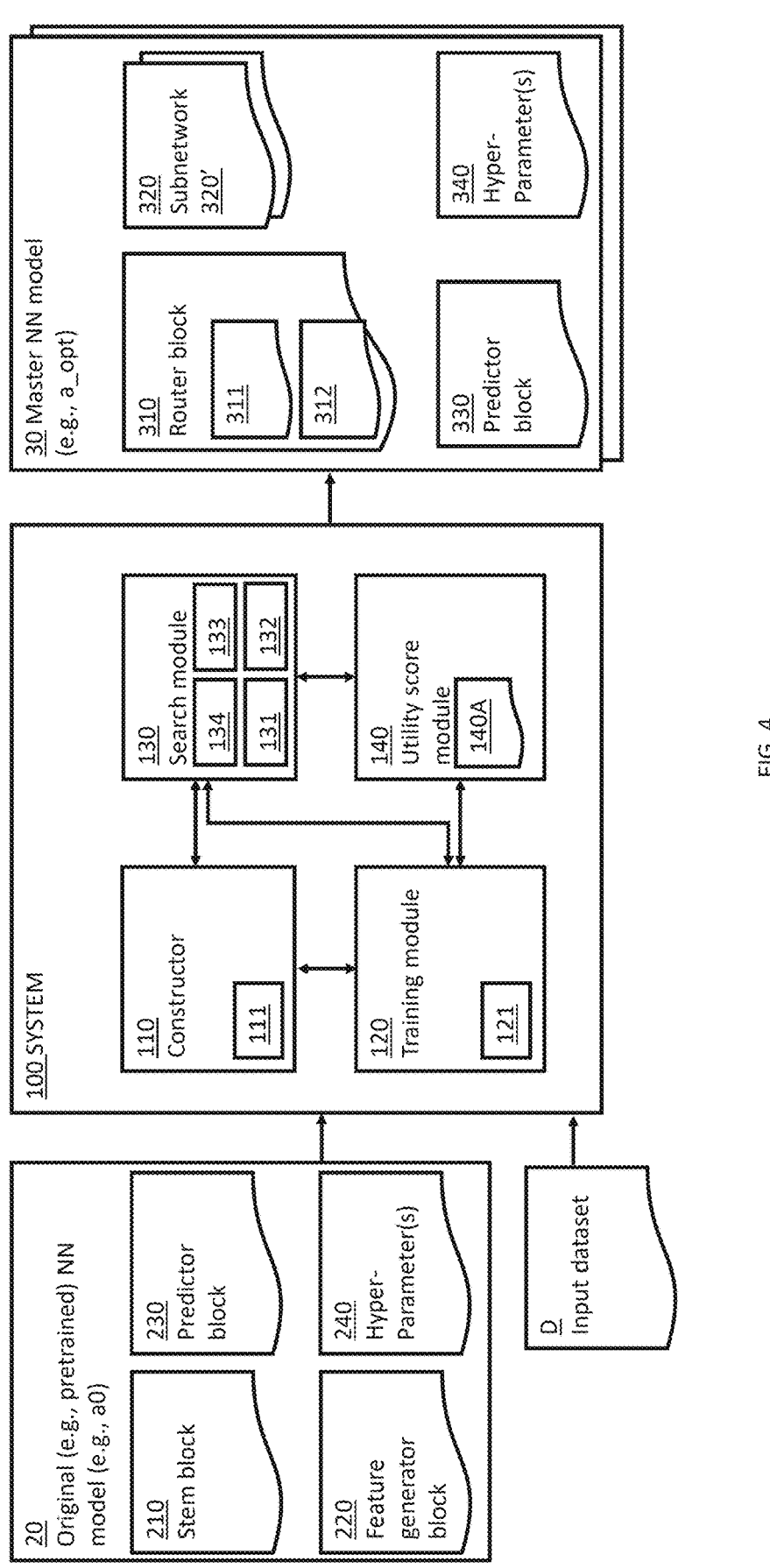
FIG. 4 is a block diagram, depicting a system for automated construction and/or optimization of a NN model, according to some embodiments of the invention.

Reference is now made to FIG. 4, which depicts a system 100 for automated construction and/or optimization of a NN model, according to some embodiments of the invention.

According to some embodiments of the invention, system 100 may be implemented as a software module, a hardware module or any combination thereof. For example, system may be or may include a computing device such as element 1 of FIG. 1, and may be adapted to execute one or more modules of executable code (e.g., element 5 of FIG. 1) to automatically construct a NN model, as further described herein.

As shown in FIG. 4, system 100 may be configured to receive (e.g., from a user, from a software application, etc., via input element 7 of FIG. 1) information pertaining to an original, trained or pretrained (trained before received) NN model 20 such as $a_0$, as elaborated herein (e.g., in relation to FIG. 3). A pretrained NN may be distinguished from a NN which has never been trained, or never having its structure altered based on training. For example, original NN model data 20 may include data representing blocks of original NN mode $a_0$, such as connections and weights of a stem block 210, connections and weights of a feature generator block 220, and connections and weights of a predictor block 230. Additionally, original model data 20 may include informa- tion pertaining to one or more hyperparameters 240 of the original NN model $a_0$, such as structural hyperparameters and/or behavioral hyperparameters, as elaborated herein.

According to some embodiments of the invention, system 100 may include a constructor module 110, adapted to construct at least one master NN model 30, implementing an optimal solution, termed for convenience "a_opt," to the optimization problem of Eq. 1, based on the trained or pretrained, original NN model data 20, as elaborated herein.

Figure 5:
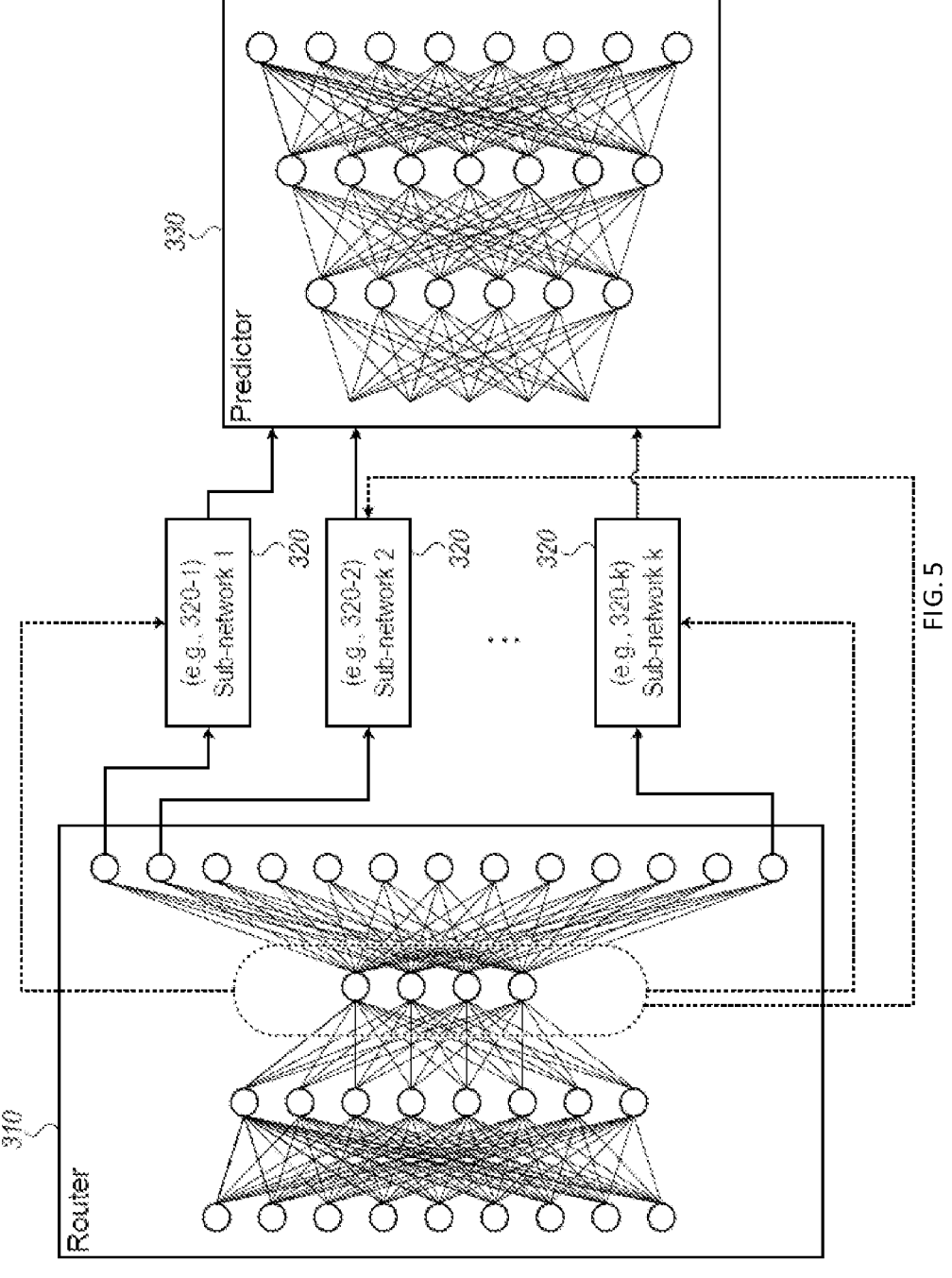
FIG. 5 is a schematic diagram, depicting an example of a structure of a master NN model, according to some embodiments of the invention.

Reference is also made to FIG. 5 which is a schematic diagram, depicting an example of a structure of a master NN model 30, according to some embodiments of the invention.

As shown in FIG. 5, constructor module 110 may con- struct master NN model 30 so as to include a plurality of sub-models or subnetworks 320. Each subnetwork 320 of master NN model 30 may be adapted to perform a portion of a task of original NN $a_0$ (e.g., as elaborated herein in relation to FIG. 2B).

Additionally, constructor module 110 may construct mas- ter NN model 30 so as to include a router block 310, as elaborated herein. As demonstrated in the example of FIG. 2B, router block 310 may be adapted to direct one or more data instances of an input dataset D to a specific subnetwork 320 of master NN model 30. Additionally, constructor module 110 may construct master NN model 30 so as to include a predictor NN block 330 that may, for example, be initialized as a copy of the predictor NN block of original NN model $a_0$.

According to some embodiments of the invention, and as shown in FIG. 5, each subnetwork 320 of the plurality of subnetworks 320 may receive its input (e.g., an input tensor, as known in the art) from the last hidden layer of router NN block 310. In addition, each subnetwork 320 may be emit its output to predictor NN block 330.

According to some embodiments, constructor module 110 may construct master NN model 30 based on information 20 that may be included in, or pertaining to the original, pretrained NN model 20 $a_0$, and/or based on the associated hyperparameters 240, as elaborated herein.

Figure 6:
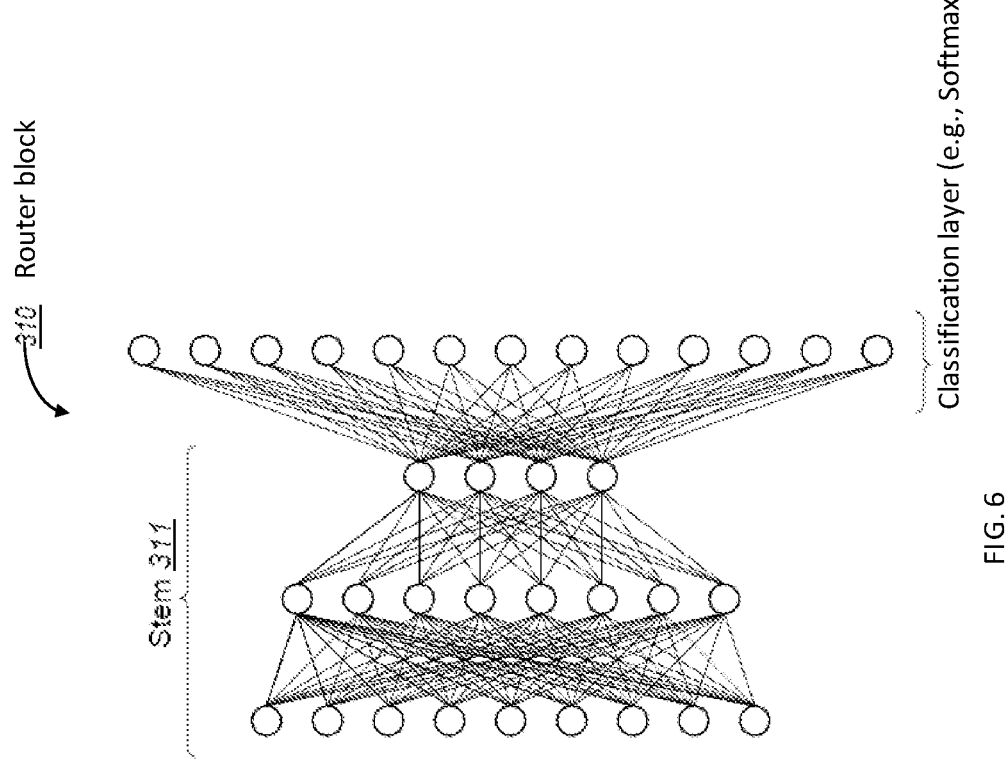
FIG. 6 is a schematic diagram depicting an example of a router block, according to some embodiments of the invention.

Reference is now also made to FIG. 6, which is a schematic diagram depicting an example of a router block, according to some embodiments of the invention.

According to some embodiments, constructor 110 may utilize definitions pertaining to the stem block (e.g., the number of layers pertaining to the stem block) in the structural hyperparameters 240 of original model 20, and/or the pretrained structure (e.g., weights of nodes) of a stem block 210 of original model 20 to construct an initial version of a router 310 of the at least one master NN model 30.

According to some embodiments, original, pretrained NN model 20 may include a first stem block 210, as elaborated herein (e.g., in relation to FIG. 3 and/or FIG. 4). As shown in FIG. 6, constructor 110 may copy at least one portion, containing a contiguous initial block of already trained layers of the first stem block 210, to produce a second stem block 310.

According to some embodiments, constructor 110 may produce a classifier block or layer, such as a softmax classification layer 312, and may append or connect classifier block (e.g., the softmax classification layer) 312 to the last layer of the copied stem block 310, so as to obtain a router NN block 310. As shown in FIG. 5, constructor 110 may connect the last hidden layer of the router NN block 310 (e.g., the last layer of the copied stem block 311) to the plurality of subnetworks 320.

According to some embodiments, router 310 may be adapted to classify an instance of an input dataset D to one of a plurality of classes, and route said instance (or data deriving therefrom) to be handled by a respective subnetwork 320.

For example, in some embodiments, the number of classes may be equal to the number K of subnetworks 320 (e.g., as depicted in FIG. 5). In such embodiments, classifier block (e.g., softmax classification layer) 312 may include an encoder (e.g., a one-hot encoder), adapted to indicate a selection of one or more specific classes of the K classes, and router 310 may be adapted to route or direct its output to the one or more respective subnetworks 320 of the K subnetworks, for further processing.

According to some embodiments, system 100 may include a training module, adapted to train at least one portion of router NN 310 so as to direct one or more data instances of the input dataset D to a specific subnetwork 320 of the K subnetworks 320 of master NN model 30.

According to some embodiments, the weights of router 310 may be initialized by a default value. In such embodiments, training module 120 may use a plurality of data instances of input dataset D to train at least one portion of router NN 310 (including, stem block element 311 and classification layer 312), as part of master NN model 30.

Additionally, or alternatively, the weights of stem NN block 311 of router 310 may be initialized according to (e.g., to be the same as) corresponding weights of stem NN block 210 of original, pretrained model 20. In such embodiments, training module 120 may train router 310 based on prior knowledge of activation patterns in $a_0$, to classify or partition the data space into uncorrelated classes, and thus promote uncorrelated subnetworks.

For example, training module 120 may include a machine learning (ML) based clustering module 121, adapted to produce clusters based on input vectors emerging from activation patterns of neural nodes in a last layer of stem NN block 311, corresponding to specific data instances of the input dataset. In other words, clustering module 121 may be or may include a NN model of clusters, that may predict activation of specific nodes in a last layer of stem NN block 311, in response to specific input data instances of dataset D.

According to some embodiments, clustering model 121 may include a non-supervised clustering model, adapted to receive input from a layer preceding said last layer of stem NN block 311, and produce said clusters of data instances, based on (a) activation of nodes in the last layer of stem NN block 311 and (b) input from the layer preceding said last layer of stem NN block 311. In other words, clustering module 121 may use or employ a data-dependent algorithm such as a vectorial clustering algorithm (e.g., a K-means algorithm, as known in the art) to partition the dataset to clusters, based on activation patterns.

Additionally, or alternatively, clustering model 121 may be or may include a supervised clustering model, adapted to and produce said clusters of data instances, based on (a) activation of nodes in the last layer of stem NN block 311, (b) input from the layer preceding said last layer of stem NN block 311 and (c) labeling data or other metadata included in the input dataset (e.g., element D of FIG. 4).

According to some embodiments, training module 120 may train at least one portion of router NN 310 to direct one or more data instances of dataset D to specific subnetworks 320, using said clusters as supervising data. For example, training module 120 may train router NN 310 to direct a first data instance, pertaining to a first cluster of clustering module 121, to a first subnetwork 320, and direct or route a second data instance, pertaining to a second cluster, to a second subnetwork 320.

It may be appreciated that the one or more master NN models may be adapted to perform the same task (e.g., image analysis tasks) as original, pretrained NN 20, and may thus be trained (e.g., by a process of supervised training) by using input dataset D or any other dataset that may be used for training NN 20.

Additionally, it may be appreciated by a person skilled in the art that training master NN model on dataset D, while assigning or directing data instances (e.g., images) that pertain to separate clusters to respective subnetworks 320, may result in low correlation between subnetworks 320. In other words, each subnetwork 320 may become, through training, more specifically adapted to handle a respective subset of input dataset D.

According to some embodiments of the invention, training module 120 may train router NN 310 in a plurality of phases. For example, in a first (e.g., an initial) training phase, training module 120 may introduce to the at least one master NN model a plurality of data instances of input dataset D, and may train the at least one portion of the router NN based on output of the master NN model (e.g., in a similar manner to the training of original NN model $a_0$). In a second training phase, training module 120 may train one or more portions router NN block based on activation patterns, as elaborated herein. In a third training phase, training module 120 may introduce to a selected master NN model (e.g., one that satisfies the optimization requirement of a_opt according to Eq. 1) a plurality of data instances of input dataset D. Training module 120 may train router NN 310 based on said introduced data instances as part of "fine tuning" of selected master NN model 30.

According to some embodiments of the invention, and as elaborated herein (e.g., in relation to FIG. 3 and/or FIG. 4), original, pretrained NN model 20 may include a predictor block 230. In such embodiments, constructor module 110 may construct at least one master NN model 30 that may include a second predictor block 330 that may be a copy of at least one portion of predictor block 230. In other words, constructor module 110 may utilize definitions pertaining to predictor block 230 (e.g., the number of layers pertaining to the predictor block) and/or the pretrained structure of the predictor block of original NN mode 20 (e.g., representing model $a_0$) to produce an initial version of a predictor block 330 that may be a copy of the predictor block of original NN model 20. In a second, later stage, training module 120 may retrain predictor block 330 of master NN 30, so as to "fine tune" the functionality (e.g., the accuracy) of Master NN model 30.

According to some embodiments of the invention, and as elaborated herein (e.g., in relation to FIG. 3 and/or FIG. 4), original, pretrained NN model 20 may include a feature generator block 220. In such embodiments, constructor module 110 may construct at least one master NN model 30 that may include a plurality of subnetworks 320. Constructor module 110 may include, in each of the plurality of subnetworks 320, a second feature generator block 320'.

In some embodiments, constructor module 110 may copy at least one portion of the first feature generator block 220, and include said copy as a feature generator block 320' in one or more subnetworks 320 of the plurality of subnetworks. In other words, constructor module 110 may utilize definitions pertaining to feature generator block 220 (e.g., the number of layers pertaining to the feature generator block) in the structural hyperparameters 240 of original NN model 20 and/or the pretrained structure of feature generator block 220 of original NN model 20 to initialize subnetworks 320 of master NN model 30. In such embodiments, subnetworks 320 may initially be large (e.g., may be copies of feature block 220). In a subsequent optimization process, search module 130 may decrease (e.g., monotonically decrease) the size of these subnetworks 320, until reaching a stopping condition, e.g., until master NN model reaches required performance (e.g., accuracy, latency, etc.) and size requirements.

Additionally, or alternatively, constructor module 110 may include at least one untrained or default NN block as a feature generator block 320' in one or more subnetworks 320 of the plurality of subnetworks. The term "default NN block" may refer, in this context to an NN block that may have, or may be defined for example by a default number of layers, a default number of neural nodes within layers, a default connectivity among layers, and/or one or more default weight values. For example, constructor module 110 may initialize a subnetwork 320 to include an empty (e.g., having no NN layers), feature generator block 320'. In such embodiments, subnetworks 320 may initially be small (e.g., empty). In a subsequent optimization process, search module 130 may increase (e.g., monotonically increase) the size of these subnetworks 320, until reaching a stopping condition, e.g., until master NN model reaches required performance (e.g., accuracy, latency, etc.) requirements.

It may be appreciated by a person skilled in the art that any combination or mixture of the options discussed above may be possible. For example, constructor module 110 may: (a) initialize one or more subnetworks 320 to include feature generator block 320' that are "small" (e.g., empty) NN blocks; (b) initialize one or more subnetworks 320 to include feature generator block 320' that are default NN blocks (e.g., having a predefined number of layers, neural nodes, connections and/or weight values); and/or (c) initialize one or more subnetworks 320 to include feature generator block 320' that are "large" (e.g., copies of one or more portions of feature generator block 220).

Additionally, or alternatively, constructor module 110 may receive (e.g., from a user or an application, via input device 7 of FIG. 1) a choice or selection (e.g., a user's choice) of a weight initialization option 111. Weight initialization option choice 111 may be, for example, initialization of at least one weight value as a default value, initialization of at least one weight value as a corresponding value of at least one weight of feature generator block 220 of the original, pretrained NN model 20, and the like. Constructor module 110 may subsequently apply the chosen weight initialization option to at least one corresponding weight of a feature generation block 320' of one or more subnetworks 320 of master NN model 30.

Referring back to FIG. 4, and according to some embodiments of the invention, system 100 may include a search module 130 that may be adapted to produce one or more structural permutations or transformations 131 on a master NN model 30, as elaborated herein. Such structural transformations 131 may include, for example, addition of one or more layers in one or more subnetworks 320, omission of one or more layers in one or more subnetworks 320, alteration of a NN layer, addition of one or more NN links (e.g., between NN nodes), removal one or more NN links (e.g., between NN nodes), and the like. Additional structural transformations 131 may also be possible. Search module 130 may subsequently collaborate with constructor module 110 to produce one or more master NN models, corresponding to said transformations 131.

For example, search module 130 may receive data pertaining to a structure (e.g., the number of layers) of a subnetwork 320 of a first master NN model. Search module 130 may select a specific transformation 131 to be applied on the structure of the first master NN model, including for example omission of a specific layer of subnetwork 320. Search module 130 may subsequently produce an instruction for constructor module 110, which may, in turn produce a second master NN model 30 that may lack the omitted layer of subnetwork 320.

According to some embodiments of the invention, search module 130 may perform or manage an iterative optimization process, in which a plurality of master NN models 30 may be constructed and trained, and subsequently filtered (e.g., discarding one or more master NN models 30) to produce a master NN model 30 that is optimized, in a sense that it corresponds to the requirement of Eq. 1.

According to some embodiments, the iterative optimization process may include operations such as:

In one step, search module 130 may collaborate with constructor module 110 as described above, to perform or introduce one or more permutations or transformations 131 on one or more subnetworks 320 of a first master NN model 30, so as to produce one or more respective, second master NN models 30 according to said transformations 131.

In another step, training module 120 may train one or more elements (e.g., layers of subnetworks 320) of the one or more second (e.g., the newly constructed) master NN models 30. Training module 120 may train the one or more elements on a plurality of data instances (e.g., a subset) of input dataset D.

According to some embodiments, search module 130 may collaborate with constructor module 110 as described above, to perform a confined NN search algorithm. The NN search algorithm may be confined in a sense that it may not produce any architecture or configuration of a NN. Instead, the confined NN search algorithm may produce one or more NN architectures that may be configured as master NN models as elaborated herein (e.g., in relation to FIG. 5) and may be based on the architecture of pretrained, original NN model 20.

For example, the NN search algorithm may be confined to an NN search space (e.g., element "A" of Eq. 1), that may include an aggregation of all possible master NN models determined according to content of one or more blocks of the pretrained NN model 20. For example, the NN search algorithm may be confined to an NN search space that may be defined by an aggregation of all NNs that include for example: a copy of at least one portion of stem block 210, one or more copies of at least one portion of feature generator block 220 (e.g., as subnetworks 320), a copy of at least one portion of predictor block 230, and/or a classification layer 312.

According to some embodiments of the invention, system 100 may include a utility score module 140, adapted to calculate, for each master NN model 30, a utility score or rating 140A, as elaborated herein. In a third step (c), utility score module 140 may calculate a utility score for one or more master NN models (e.g., the first master NN model and second master NN models).

In a subsequent step (d), search module 130 may select at least one master NN model of the first master NN model and the one or more second (e.g., newly created) master NN models based on the calculated utility score or rating, obtain an optimal master NN model 30, as elaborated herein (e.g., in relation to Eq. 1).

Utility score 140A may, for example, include or be calculated using a weighted sum of one or more values of calculated metrics, corresponding to respective master NN models 30. For example, the calculated metrics may include a measurement of the master NN model's accuracy, a latency of execution of the master NN model on a given hardware and/or software platform (e.g., element 1 of FIG. 1), and the like. As elaborated herein, utility score module 140 may subsequently select at least one master NN model of the plurality of constructed master NN models, based on the utility score. For example, utility score module 140 may discard one or more master NN models 30 having the worst (e.g., lowest) utility score 140A, and keep the rest of the plurality of master NN models 30.

The optimization process described above, of generation of a plurality of master NN models 30, and selection of one or more master NN models 30 therefrom, may be repeated iteratively. For each iteration, at least one selected master NN model of a previous iteration may be used as a new, "first" master NN model, to start a new iteration therefrom. Search module 130 may proceed these iterations until a predefined stopping condition is met, where a master NN model 30 that implements an optimal model a_opt (e.g., as elaborated in relation to Eq. 1) is selected. The predefined stopping condition may be, for example, reaching a target performance metric (e.g., a target accuracy, a target latency, a target power consumption, and/or any combination thereof), reaching a limit number of performed iterations, reaching a limit amount of spent resources (e.g., time, computing resources, etc.), reaching a size of at least one master NN model, and any combination thereof.

According to some embodiments, after reaching the predefined stopping condition, at least one (e.g., exactly one) master NN model 30 of the plurality of master NN models 30 may be selected. For example, the predefined stopping condition may include reaching a predefined target performance metric (e.g., low latency), and the master NN model 30 may be selected as the one having the best performance metric value (e.g., the lowest latency) among the plurality of master NN model 30. Additionally, and as elaborated herein (e.g., in relation to Eq. 3, in relation to FIG. 7), embodiments of the invention may calculate a utility function value or utility score, to select a master NN model 30 from the plurality of master NN model 30. Such utility functions may be utilized for selection of a master NN model 30 based on a plurality of metrics (e.g., accuracy and latency), as elaborated herein.

Embodiments of the present invention may include a practical application for improving execution of an NN model. For example, the selected master NN model 30 may subsequently be implemented (e.g. copied and/or installed onto a server) by a user in an application that may be configured to implement the same ML task as pretrained NN model 20, with better performance metrics.

As elaborated herein, search module 130 may be referred as such, in a sense that it may perform the optimization process described above as a NN search over a directed search graph (marked as element 132 in FIG. 4). As known in the art, a directed graph may be a data structure that may include one or more nodes or states, as commonly referred to in the art. The states may be associated or interconnected by a directional connection or an edge, as commonly referred to in the art, leading from a first state to a second state. The data structure of directed graph G may be stored (e.g., as a table) in at least one storage device such as element 4 and/or element 6 of FIG. 1.

In the notation used herein, the search graph may be denoted by 'G'; a space or field of possible states in graph G may be denoted by 'S'; a specific state within S may be denoted by an indexed 's' (e.g., s∈S, s0 denoting state number 0, s1 denoting state number 1, etc.); a space or field of possible edges may be denoted by 'E'; an edge included in 'E' may be denoted as an indexed 'e' (e∈E); and an NN architecture search space, e.g., an aggregation of all master NN models 320 that may be implemented or executed on a relevant hardware and/or software (e.g., element 1 of FIG. 1) may be denoted by 'A', as elaborated herein (e.g., in relation to Eq. 1). Additionally, each state s∈S may correspond to an admissible master NN network in 'A'. The master NN model associated with s may thus be denoted as M(s).

Additionally, each directed edge e∈E (e.g., s1→s2) may correspond to an admissible transformation 131 of master NN model M(s1) to master NN model M(s2). The set of admissible transformations 131 may be defined as operations that may be applied on M(s1), and may include, for example addition of a NN layer, omission of a NN layer, alteration of a NN layer, addition of one or more NN links (e.g., between NN nodes), removal one or more NN links (e.g., between NN nodes), and the like. The term 'Admissible' may be used here to refer to an operation that may be performed on a specific, relevant hardware and/or software platform H (e.g., element 1 of FIG. 1). For example, advanced graphical processing units (GPU) may support a large variety of known neural network layer configurations, whereas other computing devices of interest may not support all such layer configurations and therefore the set of available or admissible operations in nodes of the search graph G may be restricted accordingly.

According to some embodiments, each state s∈S of directed search graph G 132 be associated with one or more values of a quality metric function.

For example, at least one state s∈S (e.g., s0) may be associated with two values of two respective quality metric functions. The first value may represent a generalization error that may be measured (as known in the art) by executing master NN model M(s) (e.g., M(s0)) on a validation subset of the data D. This error value may be denoted herein as E(s) (e.g., E(s0)), a value of the error function in state s0). In other words, E(s) may denote the average error of network M(s) as measured on the validation set. A second value may represent a performance quality metric, such as latency of execution of a master NN model with respect to a relevant hardware and/or software platform H (e.g., element 1 of FIG. 1). This value may be denoted herein as L(s) (e.g., L(s0)). In other words, L(s) may represent the mean calculation time required by master NN model M(s) to perform a forward pass over a single instance of data, computed over the relevant hardware and/or software platform H.

According to some embodiments, utility score module may calculate or estimate L(s) is done by: sampling a set of data instances of dataset D; measuring, for each data instance, a calculation time of execution (e.g., a forward pass, as commonly referred to in the art) of that instance on the relevant hardware and/or software platform H (e.g., element 1 of FIG. 1); and calculating an arithmetic mean of calculation times over the sampled set of data instances.

According to some embodiments of the invention, search module 130 may initiate the optimization process (e.g., the NN search for an optimal master NN model a_opt) at an initial state s0 corresponding to an initial master NN model 30, that may be constructed by constructor module 110, as described herein (e.g., in relation to FIG. 4 and/or FIG. 5). Search module 130 may progress the NN search, by transitioning from a first state (e.g., from s0) to subsequent one or more second states (e.g., a set including s1, s2, and s3), referred to herein as a solution front. Said solution front is denoted herein by 'F' and marked as element 133 in FIG. 4. In each transition utility score module 140 may compute the values of said quality metric function for the relevant states (in this example E(s1), L(s1), E(s2), L(s2), E(s3), L(s3)).

According to some embodiments, search module 130 may be configured to identify a state s*∈F that satisfies equation Eq. 2 below:

$$E(s^*) \le E(s0) + \varepsilon, L(s^*) < L(s0) \qquad \text{Eq. 2}$$

where ε is a small value (e.g., a small percentage, such as 1%) of original error E(s0).

According to some embodiments, utility score module may compute a utility score 140A pertaining to a specific state s∈S, that may be denoted herein as U(s). Utility score 140A, may be computed as a weighted sum of one or more values of calculated metrics, corresponding to the respective master NN model 30 M(s). The one or more calculated metrics may include, for example, a level of accuracy of a master NN model 30, a latency of execution (e.g., forward propagation) of master NN model 30, a throughput of execution (e.g., forward propagation) of master NN model 30 and a value of power consumption by execution (e.g., forward propagation) of master NN model 30. For example, a utility score 140A for a specific state may be calculated according to the following equation Eq. 3 below:

$$\text{as } \lambda 1 * E(s) + \lambda 2 * L(s), \qquad \text{EQ. 3}$$

where λ1 and λ2 may be predefined weight values.

Additionally, or alternatively, utility score module 140 may estimate or evaluate a utility score 140A pertaining to a specific state, according to an estimated trade-off between the L(s) and E(s) metrics, as elaborated herein.

According to some embodiments of the invention, search module 130 may be configured to store (e.g., as part of graph G 132, in element 6 of FIG. 1) an indication or representation of each state that has been traversed during of the described NN search algorithm. For example, when traversing from a first state (e.g., s0, representing master NN model M(s0) to a solution front F that includes a plurality of second states (e.g., states s1 and s2, representing master NN models M(s1) and M(s2) respectively), search module 130 may store one or more properties of the new states (e.g., states s1 and s2) such as the configuration of the respective master NN models (e.g., the number of layers of M(s1) and M(s2)). In a subsequent step, search module 130 may consult graph G 132 so as not to repeat a state that has already been visited (e.g., not to return to state s0).

It may be appreciated by a person skilled in the art that the process of searching for an optimal master NN model 30 M(s), may require training of a plurality of master NN models 30 and comparison of a respective plurality of performance metrics (e.g., E(s), L(s)). System 100 may therefore employ one or more methods for fast training and estimation of pertinent performance metrics, to select one or more candidate master NN models 30, as elaborated herein.

According to some embodiments, training module 120 may train at least one portion of a subnetwork 320 of a master NN model to a high level of accuracy by a process referred to as incremental layer training.

During the incremental layer training process, training module 120 may train subnetwork 320 layer after layer, such that each layer is trained until it is sufficiently converged (e.g., beyond a predefined threshold). In other words, training module 120 may sequentially train subnetwork 320 by: selecting a NN layer for training, "freezing" all weight values pertaining to other layers; introducing a plurality of data instances (e.g., one data instance at a time) of input dataset D to the master NN model 30, to obtain an output of the master NN model 30; performing a back-propagation process, during which only the values of weights associated with the selected layer are updated based on the output (e.g., using a stochastic gradient descent calculation); and repeating the above steps with subsequent NN layers until all the layers of subnetwork 320 are trained. The term "subsequent" may be used in this context to refer to an adjacent layer of subnetwork 320 (e.g., in the direction of an input of subnetwork 320 or in the direction of an output of subnetwork 320).

It may be appreciated by a person skilled in the art, that training of a NN is a costly sequential process that may include a plurality T of training epochs, as commonly referred to in the art. Accordingly, a straightforward solution in which a plurality of N NNs are fully trained may consume the time and computational resources required by T*N training epochs. It may also be appreciated that that testing of a network (e.g., after being trained) is a relatively cheap process, that may incur a negligible cost.

According to some embodiments, search module 130 may be configured to implement a process that may herein be referred to as a "round-robin elimination process", to quickly select one or more master NN models 30, among a plurality of alternative N master NN models 30, based on an approximation of utility score 140A. The term "round-robin elimination" may refer to a process that is performed cyclically (e.g., in a "round-robin" fashion, as referred to in the art), and where each cycle includes elimination of a subset or portion of the available master NN models 30.

According to some embodiments, the round-robin elimination process may include the steps of:

(a) training the one or more (e.g., N) master NN models 30 together, in cycles. In each cycle, the one or more master NN models 30 may be trained during a single epoch, one after the other. In this example, a first cycle may last a duration of N epochs;

(b) step (a) is repeated for a predefined number R of cycles, during which the relevant master NN models 30 undergo R epochs of training.

(c) after the R cycles have elapsed, utility score module 140 may calculate a utility score 140A for the relevant N master NN models 30;

(d) search module 130 may eliminate a fraction (e.g., a percentage) 1−α (where a∈ℝ, 0<α<1) of the N master NN models 30 available for selection. In some embodiments, the fraction 1−α may correspond to the (1−α)*N master NN models 30 that have the lowest utility score 140A (after a single epoch of training). The available number of master NN models (e.g., N) is diminished to include a subset of α*N master NN models 30 that have the highest utility score 140A. In other words, N is adapted to be α*N.

(e) steps (a) through (d) are repeated with the new subset of N master NN models 30, until a subset of master NN models 30 that includes a predefined number B of master NN models 30 is obtained.

According to some embodiments, the predefined number B may be 1. Thus, a single master NN model may be selected following the elaborated elimination process. Alternatively, B may be larger than 1, and thus a plurality of master NN models 30 may be selected following the elaborated elimination process. The plurality of B master NN models 30 may, for example be implemented or applied on specific computing devices (e.g., element 1 of FIG. 1, such as a server) according to computing processing resources and/or memory resources of each computing device.

It may be appreciated that the method round robin elimination method elaborated above may dramatically decrease the number of required training computations required in order to produce an optimal master NN model 30 of the plurality of N available master NN model 30.

For example, assume that (a) an initial number master NN models 30 is N; (b) system 100 is required to select the best B master NN models 30 of N; (c) we may ignore the fact that quantities must be integers in practice; and (d) the number of training epochs in each cycle is 1, then the total number of required training epochs m may be calculated according to the following Equation, Eq. 4:

$$m=N(1+\alpha+\alpha^2+\ldots+\alpha^{(m+1)})=N(1-\alpha^m)/(1-\alpha) \qquad \text{Eq. 4}$$

Since the final number B of master NN models 30 may be calculated as B=N*am, we may apply some arithmetic operations to calculate the total number of required training epochs m according to the following Equation, Eq. 5:

$$m=(\log(N/B))/(\log(1/\alpha)) \qquad \text{Eq. 5}$$

According to some embodiments of the invention, training module 120 may perform additional training of the one or more selected master NN models 30, to "fine tune" these networks and to improve their accuracy. For example, training module 120 may introduce one or more data instances of the input dataset D (and/or data instances pertaining to a validation dataset or a testing dataset, as known in the art) to the selected master NN model 30. Training module 120 may subsequently train the selected master NN model 30 based on the one or more introduced data instances.

Figure 7:
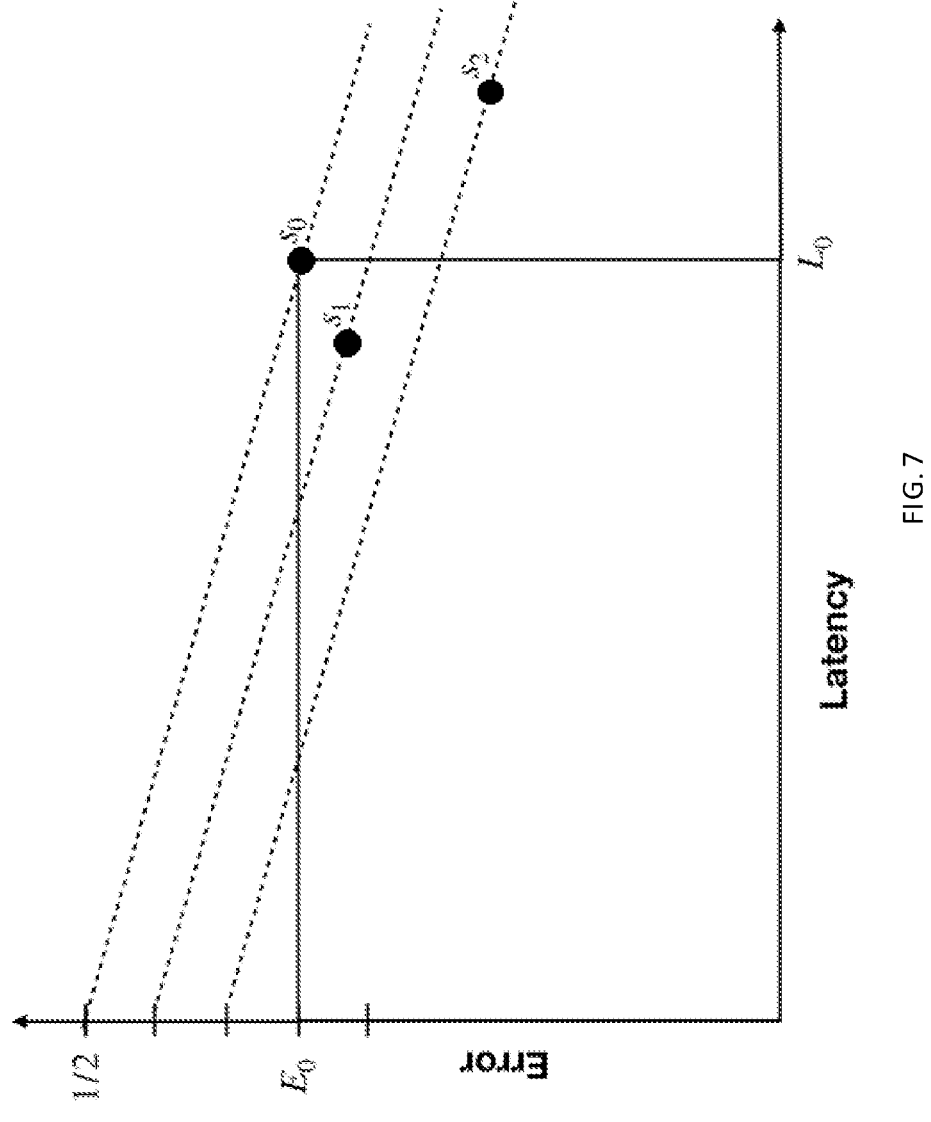
FIG. 7 is a schematic diagram depicting a tradeoff between a first measurable performance metric (e.g., accuracy) of a NN model and a second measurable performance metric (e.g., latency) of the NN model.

Reference is now made to FIG. 7 which is a schematic diagram depicting a simplified tradeoff utility function between a first measurable performance metric (e.g., accuracy) of a NN model and a second measurable performance metric (e.g., latency) of the NN model.

As described herein, (e.g., in relation to Eq. 3), search module 130 may be configured to compare between two or more utility values so as to select one or more master NN model 30 (e.g., each pertaining to a state s), and perform optimization within a set S of states. In other words, search module 130 may compare between two states, each with its own latency and error metrics.

For example, assume that state s1 is characterized by latency l1 and an error profile e1, and state s2 is characterized by latency l2 and an error profile e2. It may be appreciated that there may be a relation of tradeoff between latency and error. So s1 may only be defined as definitely superior to s2 if both l1<l2 and e1<e2 hold. In this condition, s1 may be referred to as "dominating" s2.

However, in many cases only one of these conditions holds and no state dominates the other. Therefore, in order to perform multi-objective optimization among states of S, search module 130 may require a utility function U(s) (e.g., element 134 of FIG. 4), as depicted in the simplified example of FIG. 7. According to some embodiments, utility function U(s) 134 may be stored (e.g., as a table in a storage device, such as element 6 of FIG. 1).

As shown in FIG. 7, a first state s0 (e.g., an initial state) may be characterized by a first pair of performance metrics (e.g., L0,E0), a second state s1 may be characterized by a second pair of performance metrics (e.g., L1,E1), and a third state s2 may be characterized by a third pair of performance metrics (e.g., L2,E2).

It may be clear that state s1 dominates s0, however relation between s0 and s2 or between s1 and s2 may not be as clear. Search module 130 may utilize utility function U(s) 134 so as to compare between such non-dominating states.

In the simplified example of FIG. 7, utility function U(s) 134 is a linear function is y=ax+b, which intercepts the profiles (0, 1/2) and (L0,E0). The rationale for this definition is that a zero-latency network may not obtain better performance than a random selection (e.g., error rate=1/2). Based on the fact that deep neural networks have lower error, the zero order approximation is set as a linear approximation of the contribution of network latency to the reduction of the error rate.

It may be appreciated that a linear approximation may not be accurate and better approximation should follow the law of diminishing returns. However, it has been experimentally found that such linear approximation is often sufficient. Using the slope a of the linear approximation, and extrapolating to other profiles in the proximity of (L0,E0), the utility U(s) function 134 value for a given state s∈S with a profile (L, E) may be defined to be the error intercept of the same slope line passing through the profile (L, E). In other words, U(L, E)=−aL+E. For example, by this definition, search module 130 may identify s2 as the best state among s0, s1 and s2.

For other problems, such as multi-class classification, regression, and the like, the value of interception on the error axis may not be ½. In such conditions, a different utility tradeoff function U(s) 134 may be selected, based for example on prior knowledge of the task, or by using a process of prediction advantage, which may define a meaningful normalization for any loss metric, as known in the art.

Reference is now made to FIG. 8 which is a flow diagram, depicting a method of automated construction and/or optimization of a NN model by at least one processor (e.g., element 2 of FIG. 1), according to some embodiments of the invention.

As shown in step S1005, the at least one processor 2 may receive a pretrained NN model (e.g., element 20 of FIG. 4).

As shown in step S1010, the at least one processor 2 may construct at least one master NN model 30, based on the pretrained NN model 20, as elaborated herein (e.g., in relation to FIG. 5). Each master NN model may include a plurality of subnetworks elements 320 as elaborated herein (e.g., in relation to FIG. 5).

As shown in step S1015, for each master NN model 30, the at least one processor 2 may construct a router NN block 310, adapted to direct one or more data instances of an input dataset to specific subnetworks of the master NN model as elaborated herein (e.g., in relation to FIG. 5).

As shown in step S1020, for each master NN model, the at least one processor 2 calculating a utility score (e.g., element 140A of FIG. 4).

As shown in step S1025, the at least one processor 2 may be adapted to select one or more (e.g., a single) master NN model 30 of the at least one constructed master NN models

30, based on the utility score, as elaborated herein (e.g., in relation to FIG. 4 and/or FIG. 7).

Figure 9:
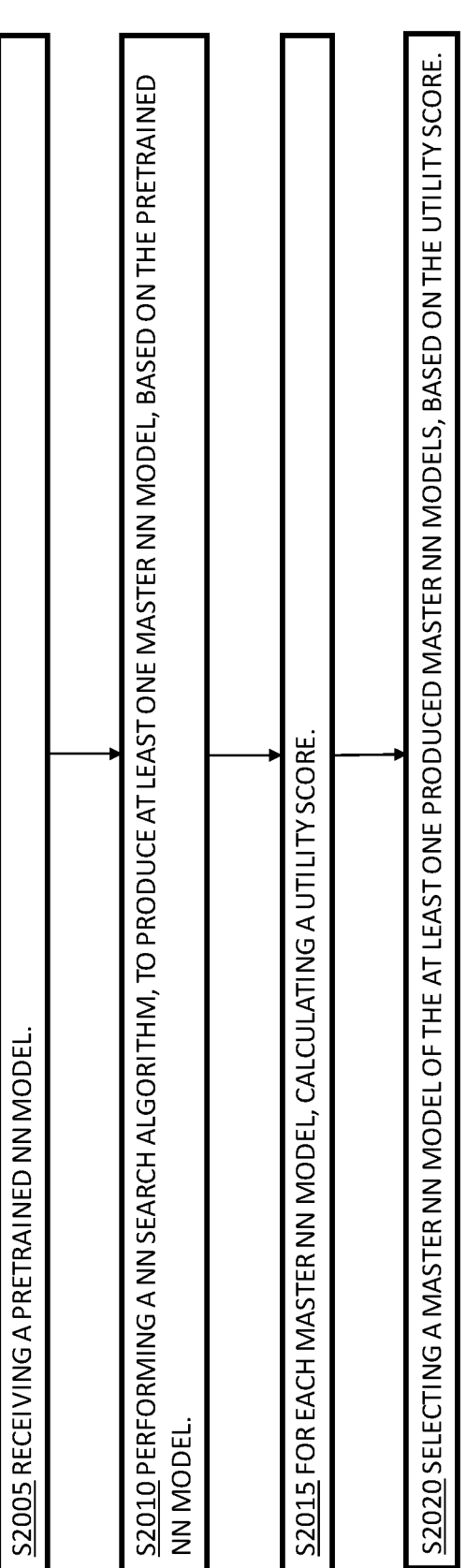
FIG. 9 is a flow diagram, depicting another method of automated construction and/or optimization of a NN model, according to some embodiments of the invention.

Reference is now made to FIG. 9 which is a flow diagram, depicting another method of automated construction and/or optimization of a NN model by at least one processor (e.g., element 2 of FIG. 1), according to some embodiments of the invention.

As shown in step S2005, the at least one processor 2 may receive a pretrained NN model (e.g., element 20 of FIG. 4).

As shown in step S2010, the at least one processor 2 may performing a NN search algorithm as elaborated herein (e.g., in relation to search module 130 of FIG. 4), to produce at least one master NN model 30, based on the pretrained NN model 20;

As shown in step S2015, for each master NN model 30, the at least one processor 2 may calculate a utility score 140A, as elaborated herein (e.g., in relation to utility score module 140 of FIG. 4).

As shown in step S2020, the at least one processor 2 may select one or more (e.g., a single) master NN model 30 of the at least one produced master NN models 30, based on utility score 140A.

Embodiments of the present invention may include a practical application for receiving an original, pretrained neural network, adapted to perform a predefined task (e.g., a task of image analysis) and automatically produce or construct therefrom a second, optimized neural network adapted to perform the same task. The second NN model may adapted to perform substantially the same ML task (e.g., an ML-based image analysis algorithm, a natural language processing (NLP) algorithm, etc.) as that of the pretrained neural network. Additionally, the second NN model may be optimized in a sense that it may (a) exhibit an accuracy level that may be substantially equal or improved in relation to the accuracy level of the first version of a pretrained neural network, and (b) have or be characterized by at least one performance parameter, such as a latency and/or throughput of NN execution, that may be superior to, or better than a corresponding performance parameter of the first, pretrained NN model.

Embodiments of the invention may provide an improvement over technology of currently available systems for producing a NN, by creating a synergy between two separate processes:

The first process is one that implements an approach of "divide and conquer", by which the dataset is divided into a plurality of separate, uncorrelated, or minimally correlated clusters, as elaborated herein (e.g., in relation to FIG. 6). Each data instance is subsequently routed to, and executed by, a selected subnetwork of the optimized NN. In other words, the selected subnetwork is specifically configured to handle data instances pertaining to a respective, specific cluster.

The second process is one that implements a NN search algorithm. The NN search algorithm may be adapted to actively search, within a confined space of available NN configurations, for an optimal NN configuration, as elaborated herein (e.g., in relation to Eq. 1). The optimal NN configuration may be an optimal master NN model 320 configuration, that may be adapted to optimally execute a task of the original NN.

It may be appreciated by a person skilled in the art that the aforementioned synergy between the two processes may be derived from confinement of the NN search algorithm to a NN search space of possible master NN models (e.g., models that include a router block, a plurality of subnetworks and a predictor block as elaborated herein in relation to FIG. 5).

As known in the art, currently available methods and systems for automated construction of NN models may include search algorithms such as a NAS search algorithm to search for an optimal NN model configuration. Such currently available search algorithms typically consider very large search spaces. For example, currently available search algorithms typically require tens of thousands of GPU computation hours, which is a requirement beyond the capability of most parties. In contrast, the structure or configuration of the optimal NN model according to embodiments of the present invention is well defined as master NN model 30 as elaborated herein (e.g., in relation to FIG. 5). Therefore, the solution space or search space (e.g., element 'A' of Eq. 1) has a very specific structure in the form of a master NN model 30, which includes a plurality of uncorrelated subnetworks 320, where each subnetworks 320 is an "expert" adapted for a specific cluster or subset of dataset D. Therefore, the search space A according to embodiments of the invention is substantially smaller or confined in comparison to the search space of currently available search algorithms (e.g., a NAS algorithm).

It may be appreciated that said confinement of the search algorithm's space of solutions to said space of possible master NN 30 configurations dictates automated production of separate subnetworks, each specifically adapted to handle or execute a specific subset or cluster of instances of the input dataset.

Additionally, as known in the art, currently available search algorithms such as a NAS search algorithm are configured to start the search for an optimal NN model configuration from "scratch", without relying on a given trained model. In contrast, embodiments of the invention may utilize parts of a trained model 20 in an initial configuration of a master NN model 30 as elaborated herein (e.g., in relation to FIGS. 4 and 5). Therefore, embodiments of the invention may be more efficient, as they start the search from a more advanced starting point, which is at least partially extracted from or based on the given trained model 20, such as the trained stem block 210, the trained predictor block 230 and/or the trained predictor.

It may also be appreciated that the search algorithm elaborated herein may include additional improvements in technology over currently available NN search algorithms. Said improvements may facilitate efficient determination of an optimal NN within the search space of possible NN configurations. The term "efficient" may refer in this context to a reduced consumption of resources (e.g., timing, computing and hardware resources), in relation to currently available NN search methods.

For example, a NN search algorithm according to embodiments of the present invention may be initiated at a starting point that is based on a configuration of a pretrained, original NN. In other words, an initial state of the NN search algorithm of the present invention may include a master NN model that may consist of carefully selected elements of the original, working NN, as elaborated herein (e.g., in relation to FIG. 3). Such elements may include for example, a copy of at least a portion of stem block 210, one or more copies of at least one portion of feature generator block 230, a copy of a predictor block 230, etc. Therefore, a NN search algorithm according to embodiments of the present invention may converge more efficiently in relation to a currently available NN search algorithm that may not utilize portions of the original pretrained NN model.

Additionally, it may be appreciated that said confinement of the NN search algorithm to a NN search space of possible master NN models may results in a convergence of the search algorithm, and determination of an optimal master NN model, that is more rapid than convergence of currently available NN search algorithms that may not be confined to the search space of possible master NN model configurations.

Embodiments of the invention may further include an improvement in technology over currently available systems for creation of NNs by employing one or more methods of quick training and/or error assessment. Such methods may include for example the incremental layer training process and round robin elimination process, as elaborated herein.

Additionally, as known in the art, currently available search algorithms such as a NAS search algorithm are normally adapted to search for an optimal NN model, where said model is referred to as "optimal" in a sense that it may have a minimal error metric. In contrast, embodiments of the invention may provide an improvement over currently available methods for automated construction and/or optimization of NN models by facilitating a composite criterion for selecting an "optimal" NN model. In other words, and as elaborated herein (e.g., in relation to FIG. 7 and/or in relation to Eq. 3), embodiments of the invention may provide an optimal NN model in a sense that said model may exhibit or have the best combination of performance metrics (e.g., error, data latency, data throughput, power consumption, etc., according to tradeoff utility function U(s)) among a plurality of NN models in search space A of Eq. 1.

Unless explicitly stated, the method embodiments described herein are not constrained to a particular order or sequence. Furthermore, all formulas described herein are intended as examples only and other or different formulas may be used. Additionally, some of the described method embodiments or elements thereof may occur or be performed at the same point in time.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

Various embodiments have been presented. Each of these embodiments may of course include features from other embodiments presented, and embodiments not specifically described may include various features described herein.

The invention claimed is:

1. A method of automated optimization of a Neural Network (NN) model by at least one processor, the method comprising:

receiving an original NN model comprising a first stem block, a first feature generator block, and a first predictor block comprising a plurality of NN layers, wherein said original NN model is pretrained based on instances of an input dataset, to perform a machine learning (ML) task on a given computing device H, with first metrics of accuracy and latency;

constructing a plurality of master NN models each comprising a router NN, a plurality of subnetworks each comprising a plurality of NN layers, and exactly one copy of the first predictor block by, for each master NN model:

constructing the router NN by producing a second stem block comprising a plurality of NN layers, based on a copy of said first stem block, and connecting a last layer of the second stem block to a classifier block comprising a plurality of neural nodes, and connecting each neural node of the classifier block to an input of one or more subnetworks, each subnetwork comprising a copy of at least a portion of the first feature generator block, and each subnetwork specialized to perform the ML task on a separate class of the input dataset, wherein an output of each subnetwork is connected to the same copy of the first predictor block;

for each master NN model, training the classifier block to (i) obtain activation patterns of neural nodes in the second stem block, (ii) classify instances of the input dataset to one of a plurality of classes, based on the activation patterns, and (iii) direct incoming data instances to specific subnetworks of that master NN model based on said classification;

for each master NN model, iteratively applying structural transformations on one or more of its subnetworks, and calculating respective metrics of accuracy and latency for executing the ML task on the computing device H until a stopping condition is reached, selecting a master NN model of the plurality of constructed master NN models, based on the respective metrics of accuracy and latency; and performing the ML task on the computing device H using the selected master NN model by inputting a data instance to the router NN which directs the data instance to a particular subnetwork for processing, and obtaining a prediction from the copy of the first predictor block.

2. The method of claim 1, wherein training the classifier block comprises:

using a data-dependent algorithm to partition the input dataset to clusters, based on the activation patterns; and training the classifier block to direct one or more data instances of the input dataset to specific subnetworks, using said clusters as supervising data.

3. The method of claim 2, wherein training the classifier block further comprises an initial training phase, said initial training phase comprising:

introducing to the at least one master NN model of the plurality of master NN models a plurality of data instances of the input dataset, to receive at least one output of the master NN model; and training the classifier block of the at least one master NN model, by applying a back-propagation algorithm on the output of that master NN model.

4. The method of claim 1, wherein constructing a master NN model of the plurality of master NN models comprises copying the first feature generator block into one or more subnetworks of the plurality of subnetworks in that master NN model, thereby constructing one or more respective second feature generator blocks.

5. The method of claim 1, wherein constructing a master NN model of the plurality of master NN models comprises constructing one or more subnetworks of the plurality of subnetworks in that master NN model as a default NN, having a default number of layers and one or more default weight values.

6. The method of claim 1, wherein constructing a master NN model of the plurality of master NN models comprises:

receiving a user's choice of a weight initialization option, said option selected from a list consisting of: (i) initializing at least one weight value as a default value, and (ii) initializing at least one weight value as a corresponding value of at least one weight of the first feature generator block; and applying the chosen weight initialization option to at least one corresponding weight of one or more subnetworks of the plurality of subnetworks in that master NN model.

7. The method of claim 1, wherein each subnetwork is adapted to:

receive an output of the second stem block as an input tensor; and based on said input tensor, emit an output of the at least one copied portion of the first feature generator block to the copy of the first predictor block.

8. The method of claim 7, wherein each NN layer of a particular subnetwork is associated with a plurality of NN weight values, and wherein training a master NN model of the plurality master NN models comprises:

selecting a NN layer of the plurality of NN layers within the particular subnetwork;

introducing a plurality of data instances of the input dataset to the master NN model to obtain an output of the master NN model;

updating only NN weight values pertaining to the selected NN layer based on said output; and repeating said introducing and updating with a subsequent NN layer of the plurality of NN layers.

9. The method of claim 1, wherein a process of constructing the plurality of master NN models comprises:

performing one or more network transformation steps on a first master NN model of the plurality of master NN models, to produce one or more second master NN models of the plurality of master NN models;

training the one or more second master NN models on a subset of the input dataset;

for each of the first master NN model and second master NN models, calculating a corresponding utility score; and selecting at least one master NN model of the first master NN model and the one or more second master NN models further based on said utility score.

10. The method of claim 9, further comprising repeating the process iteratively, wherein for each iteration, a selected at least one master NN model of a previous iteration is used as a new, first master NN model.

11. The method of claim 10, further comprising training the one or more second master NN models in cycles, wherein for each cycle, the one or more second master NN models are trained during a single epoch.

12. The method of claim 11, wherein each iteration comprises selecting the at least one master NN model by eliminating, after each predefined number of cycles, a fraction a of the plurality of master NN models, wherein said fraction a corresponds to the master NN models that have lowest utility scores.

13. The method of claim 9, wherein calculating a utility score of a master NN model of the plurality master NN models comprises calculating a weighted sum of one or more metrics, selected from a list consisting of: a level of accuracy of that master NN model, a latency of execution of that master NN model on computing device H, a throughput of execution of that master NN model on computing device H, and a value of power consumed by computing device H while executing that master NN model.

14. The method of claim 1, further comprising:

introducing the one or more data instances of the input dataset to the selected master NN model; and training the selected master NN model based on the one or more introduced data instances.

15. The method of claim 1, wherein constructing the plurality of master NN models comprises performing a confined NN search algorithm, adapted to confine the plurality of master NN models to a NN search space, which represents an aggregation of NNs that includes (i) a copy of said first stem block, (ii) copies of one or more portions of the first feature generator block, and (iii) a copy of the first predictor block.

16. The method of claim 15 wherein the confined NN search algorithm is further adapted to:

for at least one master NN model of the plurality of master NN models, repeatedly apply the structural transformation to monotonically change a size of one or more subnetworks until a stopping condition is reached, wherein the stopping condition is defined by a target latency of execution of each master NN model on the given computing platform H while maintaining predefined accuracy and size requirements;

when the stopping condition is reached, calculate a utility score for each master NN model; and wherein selecting the master NN model of the plurality of constructed master NN models is based on the utility scores.

17. A system for automated optimization of a Neural Network (NN) model, the system comprising: a non-transitory memory device, wherein modules of instruction code are stored, and at least one processor associated with the memory device, and configured to execute the modules of instruction code, whereupon execution of said modules of instruction code, the at least one processor is configured to:

receive an original NN model comprising a first stem block, a first feature generator block, and a first predictor block comprising a plurality of NN layers, wherein said original NN model is pretrained based on instances of an input dataset, to perform a machine learning (ML) task on a given computing device H, with first metrics of accuracy and latency;

construct a plurality of master NN models each comprising a router NN, a plurality of subnetworks each comprising a plurality of NN layers, and exactly one copy of the first predictor block by, for each master NN model:

constructing the router NN by producing a second stem block comprising a plurality of NN layers, based on a copy of said first stem block, and connecting a last layer of the second stem block to a classifier block comprising a plurality of neural nodes, and connecting each neural node of the classifier block to an input of one or more subnetworks, each subnetwork comprising a copy of at least a portion of the first feature generator block, and each subnetwork specialized to perform the ML task on a separate class of the input dataset, wherein an output of each subnetwork is connected to the same copy of the first predictor block;

for each master NN model, train the classifier block to (i) obtain activation patterns of neural nodes in the second stem block, (ii) classify instances of the input dataset to one of a plurality of classes, based on the activation patterns, and (iii) direct incoming data instances to specific subnetworks of that master NN model based on said classification;

for each master NN model, iteratively apply structural transformations on one or more of its subnetworks, and calculate respective metrics of accuracy and latency for executing the ML task on the computing device H until a stopping condition is reached, select a master NN model of the plurality of constructed master NN models, based on the respective metrics of accuracy and latency; and perform the ML task on the computing device H using the selected master NN model by inputting a data instance to the router NN which directs the data instance to a particular subnetwork for processing, and obtaining a prediction from the copy of the first predictor block.

\*    \*    \*    \*    \*